United States Patent [19]
Cohen-Levy et al.

[11] Patent Number: 5,423,034
[45] Date of Patent: Jun. 6, 1995

[54] NETWORK FILE MANAGEMENT WITH USER DETERMINED HIERARCHICAL FILE STRUCTURES AND MEANS FOR INTERCEPTING APPLICATION PROGRAM OPEN AND SAVE COMMANDS FOR INPUTTING AND DISPLAYING USER INPUTTED DESCRIPTIONS OF THE LOCATION AND CONTENT OF FILES

[76] Inventors: Leon Cohen-Levy, 14 Rue Du Theatre, Paris, France, 75015; Aaron Graves, 135 W. 52nd St., New York, N.Y. 10019; Sergio D. Caplan, 345 E. 73rd St., New York, N.Y. 10021; Robert D. Schmidt, 240 E. 27th St., New York, N.Y. 10016

[21] Appl. No.: 974,555

[22] Filed: Nov. 12, 1992

Related U.S. Application Data
[63] Continuation-in-part of Ser. No. 896,514, Jun. 10, 1992.

[51] Int. Cl.$^6$ .............................................. G06F 15/40
[52] U.S. Cl. ................................. 395/600; 395/160; 395/161; 364/DIG. 1; 364/222.82; 364/280.6; 364/282.3
[58] Field of Search ............... 395/600, 700, 155, 160, 395/161

[56] References Cited

U.S. PATENT DOCUMENTS

| | | | |
|---|---|---|---|
| 4,891,785 | 1/1990 | Donohoo | 395/600 |
| 5,036,484 | 7/1991 | McCoy et al. | 395/500 |
| 5,065,347 | 11/1991 | Pajak et al. | 395/159 |
| 5,115,504 | 5/1992 | Belove et al. | 395/600 |
| 5,179,718 | 1/1993 | MacPhail | 395/160 |
| 5,230,072 | 7/1993 | Smith et al. | 395/600 |
| 5,235,679 | 8/1993 | Yoshizawa et al. | 395/156 |
| 5,271,007 | 12/1993 | Kurahashi et al. | 395/600 |

Primary Examiner—Thomas G. Black
Assistant Examiner—John C. Loomis
Attorney, Agent, or Firm—Kenyon & Kenyon

[57] ABSTRACT

A file directory structure generator and retrieval tool for use in a computer network is disclosed. The computer network comprises an output device, a local memory, a shared memory, and a local processor operating according to an operating system program and an application program. The local memory and the shared memory store files in a directory structure. Each file and level in the directory structure has network access privileges. The file directory structure generator and retrieval tool has a document locator module that maps the directory structure of the files stored in the memory to a real world hierarchical file structure of files and directories independent of conventions of the operating system. The document locator module can also change the network access privileges for files and directories without exiting the application program.

34 Claims, 6 Drawing Sheets

FIG. 6

DATA BASE FIELDS 220

{"FILENAME", C 8},
{"EXTNAME", C 3},
{"PATHNAME", C 29},
{"CRTDUSER", C 25},
{"MDFDUSER", C 25},
{"DATECRTD, D 8},
{"DATEMDFD, D 8},
{"APPOWNER, C 8},
{"APPLPATH, C 65},
{"ICONCODE, C 1},
{"DATATYPE, C 1},
{"USERIDNO, C 25},
{"RESTITUT, C 1},
{"DKEYNAME, C 20},
{"DKEYCODE, C 20},
{"SKEYNAME, C 20},
{"SKEYCODE, C 20},
{"KEYWORDS, C 20},
{"COMMENTS, C 255},
{"CONTNAME, C 30},
{"TYPENAME, C 30},
{"OPTIONPK, C 30},
{"FIELD001, C 30},
{0, 0, 0, 0}

NETWORK FILE MANAGEMENT WITH USER DETERMINED HIERARCHICAL FILE STRUCTURES AND MEANS FOR INTERCEPTING APPLICATION PROGRAM OPEN AND SAVE COMMANDS FOR INPUTTING AND DISPLAYING USER INPUTTED DESCRIPTIONS OF THE LOCATION AND CONTENT OF FILES

This application is a continuation-in-part of copending application Ser. No. 07/896,514, filed Jun. 10, 1992.

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF INVENTION

The present invention is directed to a computer user interface to allow a user to store files in and retrieve files from the memories of computers arranged in a network, and more particularly, to a user friendly network access mechanism that interacts with a file directory structure generator and retrieval tool. The file directory structure generator and retrieval tool organizes systematically and intuitively the storage arrangement of files in a network and enables the retrieval of files in a non-technical fashion using database search techniques.

BACKGROUND OF THE INVENTION

Computer systems generally comprise physical devices including a processing unit, a memory device, a monitor and input-output devices such as a keyboard and a mouse. More complex computer systems include a number of processing units, memory devices and input-output devices arranged in a network.

A common network arrangement is where standalone computers, such as IBM compatible personal computers, each having a processing unit, local memory devices and a monitor, are coupled together. A central processor (called a server) can be used to coordinate the flow of information between the networked computers. A typical network may also include one or more central memory devices that can be shared by the users of the networked computers. Another common network arrangement is where 'dumb' terminals are connected to a central processor. In this arrangement, the central processor does all the processing and is shared by each user.

Computer systems are utilized by users to perform specific tasks or to solve specific problems. Typically, a computer processor is programmed to perform these tasks or solve these problems. Such a program is referred to as an application program. The application program may be stored on a local memory device or on a central memory device. Application programs, as well as carrying out the programmed function of the application, also provide the user with an interface to enable the user of the application program to communicate with the program. The interface of an application program allows a user to give commands to execute the program's instructions (for example, to underline a word when using a word processor application program or to plot a graph when using a spreadsheet program) and to interact with the computer system's operating system (for example, to retrieve a file from a memory).

Thus, application programs run in conjunction with the computer system's operating system. The operating system is a program to control the operation of the computer's physical devices. Each individual processor has an operating system. The operating system, for example, determines where in memory a piece of information is to be stored, coordinates the sending of information to a printer to be printed, and commences the operation of an application program. Operating systems also provide the user with an interface to communicate with the operating system. Commonly, the operating system's interface is a command line on the computer's monitor where the user can enter an instruction from the operating system's instruction set.

When networked, the operating system of the central processor (called the network operating system or NOS) determines how each processor and the physical devices comprising the network interact. For example, the operating system may allow a user to retrieve information saved by another user on a central memory device, or it may allow a user to save a document to a central memory device so that other users can read it but not alter it. Each network processor may also have its own operating system (such as, for example a disk operating system) to interface with the network and to control non-networked operations. A common disk operating system for personal computers is the MS-DOS operating system (Microsoft Disk Operating System).

The instruction set of an operating system usually contains simple instructions to manipulate memory, share application programs and files, control peripheral devices and run applications programs. For example, operating systems often have instructions that allow the user to do such things as display the contents of a memory device on a computer screen, delete items of information from a memory device, place items of information in a memory device, organize the information stored in a memory device into simple structures such as hierarchical directories, run application programs and have information printed.

Users often find such operating systems difficult to use. The types of commands available are few and unsophisticated. Commands are often abbreviated words, making it difficult for users to remember what a command does and when to use it. Additionally, the user has limited methods to store and structure the user's information in the memory devices and limited ways of identifying (or naming) such information. The methods used to store the information are often not user friendly and the data structures in which the information is stored are difficult to manipulate.

The user's information, stored in the various memory devices in the network, is often represented by less than meaningful names identifying that information. For example, in the MS-DOS operating system a user's information is stored as a file of information, and that file is identified by a letter representative of a memory device, then a colon, followed by a backslash, then a string of up to eight characters, a period and three characters representing the type of information stored. A typical file identifier in the MS-DOS operating system would thus be "C: \ Leonlet.doc", where the first part of the file name is a letter representing the storage device where the document is stored, the second part is an identifier selected by the user and the third part of the file name identifies the type of file and is generally determined by the operating system or application program. In the example above, the third part of the file name identifies the file as a word processing document.

When using such cryptic file identifiers, many users find it difficult to remember in which file a particular piece of information is stored. The file identifier gives little information to the user about the kind of information stored in the file. Further, the 'dot convention' used in identifying MS-DOS operating system files is unfamiliar to most users, who do not understand what each suffix in the file identifier means. Others operating systems have equally cryptic file naming conventions.

A further problem user's find when interfacing with an operating system is the way the operating system allows the user to structure stored information. To enable a user to retrieve a file from memory and to provide additional information about the contents of a file (apart from the information given by the file name), operating systems often allow a user to structure the way the files are stored. It is common to provide users with the ability to create directories and subdirectories so that files of information can be grouped in storage with related information. It is also common to allow users to save files of information in various memory devices and specify who may access those documents.

For example, a user may decide that a directory called "customer" and another directory called "vendors" is desirable. The user can create those directories and then "put" files in those directories. By "putting" a file in a directory, the user is in effect enlarging the filename for the file. For example, in the MS-DOS operating system, the identifier for a file called "address.wrd" stored in the "vendors" directory would be "c: \ vendors \ address.wrd." The "c" at the beginning of the file name specifies in which storage device the file is stored. If subdirectories are used, the file name is even more complex. Although providing the user with more information about a file (i.e. that the addresses filed stores the addresses of the user's vendors), the notation used is difficult for inexperienced users to understand. When identifying a file, the user must generally give the full name of the file, thus requiring the user to remember in which storage device, directory and subdirectory the file is placed. However, when many files have been stored, each with such a cryptic name, it is difficult to locate the desired file and to determine the contents of the various files.

Further, users are given no help in determining what directories and subdirectories are needed, in creating the directories structure and in deciding which files should be placed in which subdirectory and on which storage device. Many users, finding the process of creating directories and placing files in directories too complex, do not bother to use the operating system's directory features. Accessing and creating different directories and subdirectories is clumsy, using meaningless commands such as "cd..". When a list of files is displayed, all files are displayed at the one level. The hierarchical directory structure is not explicit in such a listing of files. The notation used in the directory structure, moreover, consists of a series of directory names and file identifiers joined by "/" and ":" characters. Such notation does not relate to the user's real world environment.

When storing files on common memory devices both the user and the systems administrator need to have the ability to specify rights users can have with respect to files stored within the network. Examples of rights a user can have include read rights, modify rights and erase rights. (This feature is often accomplished by a separate program, executed on the server, called hereafter an access program.) When using operating systems such as the MS-DOS operating system, this feature is not directly available to users. With more sophisticated operating systems or communication servers, separate tools are used to specify user rights from those used to save files within, and specify, the disk and directory structure. These server programs are difficult to operate, are not logically connected to the saving mechanism, and cannot be utilized while inside an applications program. Heretofore known computer systems have not included an integrated interface that allows users to set user rights for others on the network at the same time as saving a file using a file structure generator, and without leaving the applications program.

To overcome the problem that inexperienced users find when communicating with an operating system program, other programs have been written to provide an easier user interface that performs operating systems functions. The most successful of these advanced operating systems is Microsoft's Windows brand program that provides a graphical user interface for the MS-DOS operating system. Windows is a shell program that converts the MS-DOS operating system environment into a graphical environment. Functions such as "save," "copy," "create directory," "run a program," and the like are simplified by giving the user a graphical interface which the user can operate by means of a cursor on the monitor moved by a physical device such as a mouse. The user's commands from the graphical interface are converted into MS-DOS operating system commands by the Windows program. The program is easy to learn and simple to use. The user needs no knowledge of the difficult MS-DOS operating system conventions and commands. A further advantage of the Windows system is that it offers a standard interface that can be used by various application programs. Application programs can be written to take advantage of the Windows program so that the user sees and operates the same Windows graphical interface for each application program used. In that way, the user can use one series of "graphical commands" for both the operating system and all application programs. The user does not need to learn difficult MS-DOS operating system command abbreviations because all possible commands are displayed in natural language in the menu. The same operating system functions can be accessed from various application programs using the same method.

However, software utilizing the Windows program or other graphical user interfaces are limited by the underlying operating system. For example, the Windows program operating under the MS-DOS operating system is limited by certain characteristics of the MS-DOS operating system. Even though file manipulation functions such as "new," "open," "close," "save" and "save as" are presented to the user in a graphical way, the file identifiers used in conjunction with these commands are still the dot notation identifiers of the MS-DOS operating system. The Windows program graphical user interface makes it easier for the user to activate file manipulation commands, but the names used to identify the files are still those that are used by the MS-DOS operating system.

For example, when the user selects the "open" command from the Windows program, a box appears on the screen listing a mixture of MS-DOS operating system files and directories in no particular order or structure. The user is able to open one of these files by placing the cursor on the file name and activating a button on the mouse. The directory structure is not graphically displayed on the screen. The listing just shows a mixture of directories and files, not giving any information about the contents of these directories or files apart from that of the cryptic MS-DOS operating system file identifier. It is not apparent to the user that networked storage devices may be available.

Even though the graphical user interface of the Windows program is based on the principle that commands should be based on actions manipulating graphical worldly metaphors rather than entering cryptic commands, the file names and retrieval operations presented to the user do not create an environment molded to match the user's physical world.

The Windows program does not provide an easy to use tool to create a meaningful real world based file storage structure. For example, a user who wishes to save a document in a file is given no help as to how to name the file, is limited as to the format of the file's name, and is not encouraged to place the file in a relevant directory on the relevant storage device. More troublesome, the user cannot create a directory using the Windows program from an application program, as explained below. Further, properly arranging the secondary memory into a meaningful directory structure using the file manager programs currently provided by operating systems, such as the MS Windows File Manager program, is a lengthy manual process which requires a good operating knowledge of the operating system. This presents a difficult and challenging task for a novice user. Most users will end up working with a disorganized data and file structure.

The user is also unable to use the Windows program's graphical user interface to specify which users on a network have access to the information saved and what that access will be.

The above problems lead to nonefficient management of secondary memory, creating serious difficulties for the user in retrieving and storing files. As more and more files are stored on the network, memory becomes cluttered with unrecognizable documents and misleading file directories. Extensive (and expensive) disk space will be occupied by files that the user does not know the contents or relevance of, and which may be obsolete, reducing the efficient use of the computer as a file storage device.

When a user is operating the computer from the operating system level, a common requirement is to locate a file of data, open that file and operate upon it using an application program. Interfaces such as those of the MS-DOS operating system and the Windows program do not help users find the required file. All that is provided to the user is a list of almost meaningless file names. The contents of each file is a mystery to the user until the file is opened. Thus, to locate a relevant file, the user must remember on which device to look, examine a list of meaningless file names, and open each file in conjunction with the respective application program until the right file is located. When many files are involved, this is a time consuming process. No information, apart from the file name, length of the file and date of first creation is presented to the user about a file when examining the contents of a memory device.

A further problem encountered by users is using an operating system's file management techniques from inside an application program. Once the application program is in use, manipulation of the file structure is very difficult. Even sophisticated graphical user interface programs operating in conjunction with application programs do not allow users to create directories and delete groups of files or directories while inside the application program. For example, if a user is using a word processing program and decides to save the document but the directory the user wishes to save the document in has not been created, the user is unable to both create a new directory and save the document without leaving the word processing application program. In addition, if the user wishes to delete a directory and all the files of information stored within that directory, the user must delete each file individually and then leave the application program to delete the directory.

Computer systems sometimes allow users to access additional information about a file from a database that is unrelated to the file retrieval tool. The user can search the database for information about a file and then use the information from the database to retrieve the desired file. In such systems, the structure of the database does not reflect the storage structure of the information in the network. In addition, only one database is used on the network, containing information about all files, no matter which user created or stored the file. A user will mostly wish to search for files they created. Searching such a large database, where only a part is relevant to any one user, is a time consuming process.

SUMMARY OF THE INVENTION

The present invention provides a computer user interface to create a file structure on a network, the file structure being based on a user's physical world, and to provide a tool so that a user can easily locate, find information about the contents and access files that are, or have been previously, stored in the file structure on the network.

A representative embodiment of the present invention comprises five modular components as well as a network database and, for each user, a local database.

A first module called the install module, is used to create a real world hierarchical file structure. The file structure is based on the user's physical environment. All available storage devices are the top level of the real world hierarchical file structure. Directories, subdirectories and the files themselves comprise lower levels of the real world hierarchical file structure. The install module can display the hierarchical structure to allow the user to see and understand the network's file and storage structure.

The second component is an open module, used to find and open stored files. The open module controls an open card which is an interface that is displayed on the computer screen so that the user can enter information about the file the user wishes to open or locate. The open card can also give the user detailed information about files that have already been stored including information on the location of a file within the real world hierarchical data structure.

The third component is a save module, used to save and store files in the real world hierarchical data structure. The save module controls a save card which is an interface that is displayed so that the user can enter information about the file the user wishes to save.

The fourth component is a network access module, used to specify the access other users of the network may have to parts of the real world hierarchical file structure. Network access can be granted in relation to a single file, or to whole branches (such as specific memory devices, directories and sub-directories) of the real world hierarchical file structure. The network access module controls a network access card which is an interface displayed to the user so that the user can specify who can access parts of the real world hierarchical file structure created by that user.

The fifth component is a document locator module that allows the user to move through and manipulate the real world hierarchical data structure. The document locator module controls a Document Location Box. The Document Location Box can be accessed from the save card or the open card. Additionally, the document locator module can be designed so that it may be accessed directly from any window of the Window 3.1 program.

The open card, the save card and the network access card can be displayed on the computer's monitor while the application program is running. They can be accessed without the user having to leave the application or to understand the underlying operating system, its instruction set and its file naming conventions or the structure of the network. Further, both the open card and save card allow the user to access the Document Location Box that gives a graphical representation of the real world hierarchical data structure and allows users to manipulate the structure in a comprehensive but simple fashion.

In one embodiment, the present invention is used in conjunction with the commercially available graphical user interface program, Windows 3.1. When the Windows 3.1 program is being used, the present invention operates in the background so that the open card and the save card are available whenever the user executes a command to save or to retrieve a file. Thus, the user does not know that the present invention is in operation until it is required to be used. The present invention is not limited, however, to the Windows 3.1 interface or the MS-DOS operating system.

The exemplary embodiment of the present invention does not use the DDE interface of the Windows 3.1 program. The DDE (Dynamic Data Exchange) interface allows program developers to write macros that rely on the Windows 3.1 program's and the OS/2 operating system program's protocols. The DDE interface is a form of interprocess communication. When two or more programs that support DDE are running simultaneously, they can exchange information and commands using the DDE protocol. So that the modules described above are compatible with as many application programs as possible, and not just those that use the DDE protocols, the save module and the open module are activated whenever the application program attempts to display its save or open "dialogue" box. In an alternative embodiment, the modules of the present invention use some DDE interface calls, for example, when interfacing with an application program that is DDE compatible, but when used in conjunction with application programs that are not DDE compatible, the modules use non-DDE message processing routines. Accordingly, the present invention is compatible with application programs that are not DDE compatible.

The install module can be activated when the user installs the interface according to the present invention on a computer's hard disk drive.

The network access module can be activated when the user activates a network access button from the Document Location Box. The network access module can also be activated from an options menu in the Document Location Box. Alternatively, or in addition, the network access module can be accessed from a "documents found" screen of the open card, by selecting the appropriate document and choosing a "network access" option.

The present invention enables each level of the real world hierarchical file structure to be created based on real world objects so that the user does not have to understand the physical operation of the computer's storage system, directory structure and operating system. Levels in the hierarchy may represent real world objects. For example, instead of having to understand the concept of a storage device located in a network, the user is able to store files in an object representing a real world storage device, such as a door. The real world hierarchical file structure will be generated based on the user's real world objects and storage devices, i.e. doors will contain file cabinets, file cabinets will contain drawers which will in turn contain manilla folders which will in turn contain the actual files. The user may, depending on the complexity of the user's real world organization of information, increase or decrease the number of levels in the real world hierarchical file structure. The actual files may be in any level in the hierarchy. Each level, such as the file cabinet or the door, will have associated with it a pictorial icon that looks like the associated object. By activating these icons, the user can easily move through the hierarchy and store and retrieve files.

It should be noted that each level in the hierarchical file structure is represented by a real world object and an associated icon featuring that object. The user is not limited to the MS-DOS operating system naming conventions for each level in the directory hierarchy and does not have to understand how directories are created by the MS-DOS operating system or how the network is structured or accessed. Further, the user does not need to know that the information he or she wants is stored in a far away storage device. Indeed, the user need not understand the difference between storage devices and directories within storage devices. The same concepts and tools apply equally to both.

The organizational structure the user is familiar with in everyday life influences the file structure which is designed to enable the user to reflect his or her real world activities. This file structure can be used for both simple file structures for the single user as well as sophisticated multi-layered file structures stored on a network for multi-national corporations.

Any time that the Windows 3.1 program is in operation, the present invention remains inactive until it is triggered by the user selecting a nominated Windows 3.1 command. If the user selects a "save" or "save as" command from an application program that this invention recognizes (which means the user wishes to save the document which is currently being operated upon by the application program) or if the user indirectly triggers a save command (for example, by exiting from the application program without first saving the document being operated upon by the application program), such that the application program requires information from the user to save the document, the save module automatically comes into operation and a save card appears on the screen. When the application program does not require information from the user (as for example when the document has been previously saved and the information required has already been provided by the user), the save module is not activated. Thus, whenever the application program would usually display its save box, the save module intercepts and causes to be displayed the save card of this invention.

If the user had previously created and filed the document in the real world hierarchical file structure and the application program would usually display its save box to obtain information from the user, then the save card will be displayed on the screen instead, showing the relevant information that the user had previously entered about the contents and creation of the file to be saved. That information is stored in one or more databases. The databases can comprise, e.g., a local database and/or a network database. The local database contains information about each file saved on the user's local storage devices. The local database is for the exclusive use of that user and no other networked user can access this database. When searching for files stored on the local storage devices, the user does not tie up the network database.

The network database contains similar information about each filed stored on the networked storage devices.

Use of the split database structure enables searches to be undertaken considerably faster because they are performed in smaller databases. Further, the split database structure insures that there will not be local directory codes and entries that are duplicated in the network database. (This could happen using only one database, if one user created a directory while not logged into the network and another user created a directory of the same name while on the network.) Both databases can contain information about the files saved, a file's MS-DOS operating system filename assigned by the save module and a file's position in the real world hierarchical file structure.

If a new document that had not previously been saved is to be saved by the user, or if the user is saving a document the has not been previously stored in the real world hierarchical file structure (for example, because the file has been transferred from another system or is a file created before the present invention was installed), the save card will show a series of buttons on the save card. These buttons have headings (or field names) about information the user may wish to enter concerning the file to be saved to identify it, identify its contents, and simplify the retrieval of the file. The buttons that appear are fields with field names corresponding to certain fields in the relevant database. The field names identify topics of information about the file to be saved. The user enters information about the topic on its respective button.

Examples of buttons that may appear on the save card include a user name button, where the user may enter the name of the person who created the file, a contact button, where the user may enter the name of the person to whom the information in the file may be sent (for example, if the file contains a letter, the name of that person to whom the letter is addressed), a regarding button (or document description button), which allows the user to enter text commenting upon the file, a key words button, allowing the user to enter five separate key words concerning information on the file to help the user retrieve that file at a later date, a type-of-document button in which the user can enter the physical type of document which the file contains (for example, a letter, a spreadsheet, a graph, a report), an options button, that allows the user to save the document in a specific format acceptable by the application program, and importantly, a document location button, which when activated by the user displays a box, called a Document Location Box, on the monitor to allow the user to choose the level in the real world hierarchical file structure (including the storage device) where the document is to be stored.

At the bottom of the save card are action buttons that the user activates when finished entering the desired information into the save card buttons. One action button is an OK button which when activated adds a new record to the relevant database containing all the information shown on the save card in the respective fields. (The relevant database is either the local database if the user nominated a local memory device (i.e., a door which represents a local memory device) or the network database if the user nominated a door representing a network storage device on which the file is to be saved.) The OK button can also have other names, such as a save button. The file is saved in the nominated memory device (represented by the selected "door" in the real world hierarchical file structure) and control returns to the application program. The computer user interface of the present invention then waits until the next time that a recognized command is selected by the user, at which time either the save module or open module is activated.

The second action button on the save card is a cancel button. When this button is activated, nothing is saved and control returns to the application program.

It should be noted that the user has the option of entering information for each button. The only button which the user is required to complete is the document location button. In other words, the user may decide not to provide any information to be stored in the relevant database about a file. As this would make retrieval of the document more difficult in the future, the user is encouraged to enter such information. The document location must be entered so that the operating system knows where to store the document. It should be noted that when a file is saved, the save module assigns a MS-DOS operating system file name to the file which the user does not see and need not know. This MS-DOS operating system file name is stored in the relevant database. All future access to the document is through the open card operated by the open module.

The open card will appear on the screen whenever the user selects an open command from the application program or when the user activates the special search command from the operating system level. The open card can be used as a retrieval tool to locate and open files as well as to open the located file's related application program.

The user has the option of activating the open card from the main screen of the Windows 3.1 program by use of the special search icon. This icon/command is used to access directly the file and its related application program. The advantage of using the open card while not in an application program is that, because a user often cannot remember what application program was used to create the file the user desires to access, a general search through all files on the network (in which the user must open the related application program for each file) is avoided and the user can use the open card to locate the desired file wherever it is on the network from the operating system level and open the required application program in the one operation. For example, a memo the user previously saved may have been created by a word processing application program, such as, e.g, the Word Perfect application program, the Word application program or the Page Maker application program. If all the user can remember is that the memo was addressed to a certain person, the user can activate the open card, search all documents for the required document using the contact button as explained below, and then open that document from the open card. By opening the file from the open card, the correct application program will also be opened at the same time.

The open card (which can also be called the Retrieve card) contains a user friendly interface that enables the user to access files using any combination of identifiers which the user remembers relates to that file. Unlike the open boxes used by the prior art, the user will not have to remember an operating system file identifier or directory identifier to retrieve the required file. The open card contains a series of buttons with field names that relate to fields in the databases. If the user knows some information about the file required to be retrieved, the user may activate the button that represents that topic of information and enter that information in the button. By entering the information onto the button, the user will be able to provide parameters to search the databases.

If the network database is available, the open module searches the local database and the network database for matches. If the network database is not available, only the local database is searched.

Searching the databases will locate relevant files. The databases contain information by which the file required to be retrieved can be located.

Examples of buttons that appear on the open card include a begin-date button and an end-date button which allow the user to enter a date or a range of dates during which the required document was created, a user ID button, a document location button, a contact button, a type-of-document button, a keywords button, and a regarding (or document description) button.

The document location button presents the user with the Document Location Box, which allows the user to choose the desired file directly from the real world hierarchical file structure, thereby permitting the user to traverse the graphical representation of the real world hierarchical file structure. This is explained in more detail below.

When the user has entered information about the file to be retrieved in the relevant buttons, the user will activate a search button on the open card which causes the open module to search the local database and the network database for any matches to the data entered on the open card. All matching files (i.e. those files containing information about the files that fulfill the search criteria) are displayed in a scrolling window on the screen. When the desired document has been located and selected by the user, the user may activate an open button on the open card so that the selected document, and if necessary the application program to be used in conjunction with that document, is opened. Additionally, the user may select an option to display the network access card for a matching file to enable the user to view (and, if authorized, change) the access privileges for the selected matching file. Once a file/document is selected to be opened by a user with the appropriate privileges, control is passed from the open module to the application program relevant to the opened document. The present invention then waits until the user selects a designated save or open command from the application program.

As mentioned above, the Document Location Box (which can also be called a Locator Card) is displayed whenever the user selects the document location button from the open card or the save card. The Document Location Box is a graphical display on the monitor which allows the user to choose the actual level in the real world hierarchical file structure where the document is to be saved or retrieved from.

In a representative embodiment of the present invention, the Document Location Box contains a path window. If there is more than one memory device available to the user, icons representing those storage devices will be shown in the path window. In one embodiment, these icons look like doors. Next to each door icon that represents a local storage device will be a name the user has given to each memory device. The user may then select one of the doors using standard Windows 3.1 methods. That door icon will be displayed with all file cabinet icons, representing the next level in the real world hierarchical structure. Each file cabinet icon has the name chosen by the user displayed adjacent to the file cabinet. The user may then select the file cabinet icon in which the document is to be stored in or retrieved from. In an alternative embodiment, the name beside each icon is that given by the creator of that level in the real world hierarchical file structure.

When used on a network, the document locator module searches all the directories of all the network storage devices for files recognized by the real world hierarchical data structure. Those storage devices that are found are displayed as door icons. The door icon can be accompanied by a label of the following format "Server:-Volume Name".

Next, if a local data base is available, the local storage devices that are available are searched for directories that are recognized by the real world hierarchical data structure. Those storage devices that are found are displayed as door icons. Each door icon can be accompanied by a label from the local data base representing that local storage device. The label, in the representative embodiment, is the first 40 characters of a COMMENTS field of the entry in the local database representing the door.

In the representative embodiment, the Document Locator Module of the present invention determines which storage devices contain files recognized by the real world hierarchical data structure by examining the first directory level for directories with a predetermined name. As information can be stored on a storage device not using the present invention, this predetermined directory name will identify those storage devices that contain information recognized by the real world hierarchical data structure and will determine which directories of those storage devices contain recognized information. For example, when using the MS-DOS operating system, if the predetermined name was "DIRNAME", then a recognized storage device would contain a directory "DRIVE: \ DIRNAME", representing a door. (Thus, "DRIVE: \ DIRNAME \ Subdir" would represent a file cabinet and "DRIVE:-

\ DIRNAME \ Subdir \ SD" would represent a drawer.)

When a file cabinet icon is selected by the user, that file cabinet icon will be displayed in the path window along with all draw icons associated with that file cabinet icon at the next level of the real world hierarchical file structure. (Other non-selected file cabinet icons will disappear.) The draw icons will be displayed in the path window such that the user can see the path taken through the real world hierarchical file structure. The user may then select a drawer icon and associated manila folders will then appear. If a user selects a manila folder icon, the documents "stored" in that manila folder are displayed.

There is no conceptual limit to the number of levels in the real world hierarchical file structure the user may access. When a level at which a file is stored is reached (rather than another level of the real world hierarchical file structure) a file icon and will be displayed. That file icon can be selected by the user. If the user has entered the Document Location Box from the open window, then the file icon that the user selects from the select window will have its associated data from the relevant database displayed on the open card. The user may then open that document by selecting the open button on the open card. On the other hand, if the user has entered the Document Location Box from the save card, the user may at any stage choose at which level to store the file by selecting the appropriate level in the real world hierarchical file structure. Once that appropriate level has been selected, the user will then activate an ok button on the Document Location Box and the name of the document chosen by the user when placing the file in the real world hierarchical file structure will be entered onto the save card.

Any time the user is in the Document Location Box, the user may select an icon from the path window. By doing so, the path window will be modified so that the level represented by that icon will be the level at the end of the path in the path window. In other words, a previous level is selected as the current level. The path window will display the different choices available at the next level to that of the level selected by the user.

Also, in the representative embodiment, the Document Location Box contains five buttons, namely, Options, Add, Move, Delete and Rename. These buttons are used to manipulate the real world hierarchical file structure. In particular, the Option button enables the user to access a menu to choose the option of activating the network access card for a particular object (i.e. door, folder, file, etc.) in the real world hierarchical file structure.

When saving a file from the save card, or when viewing levels in the real world hierarchical file structure from the Document Location Box, the user has the option, using the same interface, to change or set access rights to files or levels on the central memory devices. Any file or level created by the user, or for which the user is designated as having change rights, can have its access rights changed by the user. This function is implemented by the network access module.

For example, a file containing a memo can be saved so that certain network users can read the memo and other network users can edit the memo. Setting a level's access rights automatically sets the access rights for all files and levels hierarchically below that level. A network user designated as the supervisor has all access rights to all levels and files. In the representative embodiment, only the supervisor can add a 'door' to the network.

The network access module interacts directly with the program run by the server to change network access rights to files and directories without the user having to exit the application program and without the user having to learn how operate any of the server's programs.

As can be seen from the above description, the computer networks's file storage mechanism is organized and controlled using the present invention as an interface between the user and the operating system. All documents stored or deleted from the network are added to or deleted from the real world hierarchical file structure via the open or save cards.

BRIEF DESCRIPTION OF THE DRAWINGS

FIG. 6 is a chart of the database fields of the Network Database of FIG. 1.

DETAILED DESCRIPTION

Figure 1:
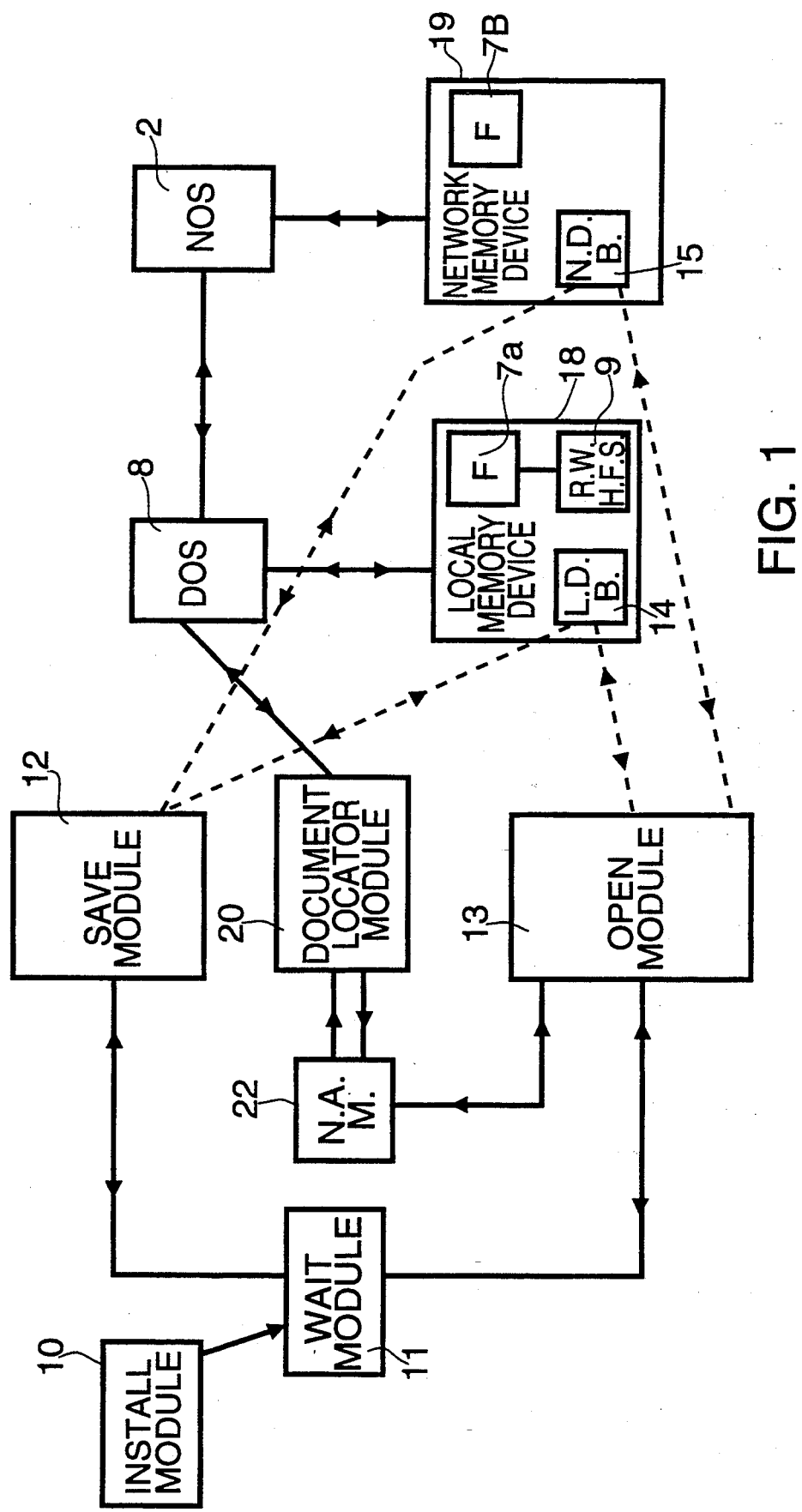
FIG. 1 is a block diagram of the modules of a representative embodiment of the present invention.

Referring now to the drawings, and initially FIG. 1, there is illustrated in block diagram form the various modules of a representative embodiment the present invention and the interaction between those modules. When the user first operates the present invention, the install module 10 is activated. The install module 10 is used to create a directory structure in the operating system 8 and a real world hierarchical file structure 9 to enable a file 7a or 7b to be located easily. Examples of the real world hierarchical file structure 9 and an example of the opertion of the modules of the present invention in flow chart form are given in application Ser. No. 896,514, "File Directory Structure Generator and Retrieval Tool", filed Jun. 10, 1992. Application Ser. No. 896, 514 is hereby expressly incorporated by reference.

After the real world hierarchical file structure 9 has been created, in the representative embodiment, by the install module 10, control is transferred to a wait module 11. The wait module 11 is a shell that operates in the background while an application program (not shown) is in operation. The wait module 11 intercepts control from the application program anytime the user gives a "save," "save as," "open" or "exit" command, or from the operating system 8 when the user gives a "search" command. The wait module 11 hides from the user the application program's interface for these commands. (In place thereof, either an open card or save card (see FIG. 2) will be displayed.) The wait module 11 determines whether to pass control to a save module 12 or an open module 13. If the user has requested a "save" or "save as" or "exit" command from the application program, and the application program requires information from the user or requires the user to confirm previously entered information, the save module 12 is activated. If the user has requested an "open" command from the application program (or activated the search command from the operating system 8), the open module 13 is activated.

The save module 12 causes a save card (see FIG. 2) to appear on the screen. The save module 12 has the capability to fill in previously stored details, (if in existence) about the file 7a or 7b on the relevant buttons on the save card. This information is retrieved from a Local Database 14 or a Network Database 15. These databases contain information the user has previously stored concerning the file 7a or 7b. In particular, the Local Database 14 stores information about files 7a stored on a local memory device 18 and the Network Database stores information about files 7b stored on network storage devices, such as 19.

On the other hand, if this is a new file, the user is given the option by the save module 12 to enter details about the file 7a or 7b on the save card. The save module 12 coordinates this entry of information.

When saving a file 7a or 7b, the save module 12 requires that the user choose an item in the real world hierarchical file structure 9 as the location to store the file 7a or 7b. The save module 12 therefore transfers control to the document locator module 20 which causes to be displayed on the screen a document location box. Using the document location box, as described below, the user is able to choose a position in the real world hierarchical file structure 9 as the storage location of the file 7a or 7b. The file 7a may be stored on the local memory device 18. Alternatively, the file 7b may be stored on the network memory device 19. The user can choose a position in the real world hierarchical file structure 9 as the location for a file without knowing about different memory devices.

Once this location has been determined, the document locator module 20 returns control to the save module 12. When the user is satisfied with all options entered into the save card, the save module 12 causes the operating system 8 to save the file 7a or 7b in a memory device (18 or 19).

When the user has completed all the desired information on the save card, the save module 12 will cause this information to be stored in the Local Database 14 (if the file 7a is stored on a local memory device 18), or in the Network Database 15 (if the file 7b is stored on a network memory device 19.) Along with this information, the operating system name and path name for the file 7a and 7b will be stored so that the operating system 8 can locate this file 7a or 7b at a later stage.

The save module 12 will remove the save card from the screen and then returns control to the wait module 11 once the file 7a or 7b has been saved. The wait module 11 will then pass control back to the application program until the next "save," "save as," "open" or "exit" command is selected by the user.

When the user selects an "open" command from the application program, or selects the search command while using the operating system 8, the wait module 11 activates the open module 13. The open module 13 will display an open card (see FIG. 4) on the screen. The open card contains a series of buttons (see FIG. 4) which the user may select to give information about the file 7a or 7b that the user wishes to retrieve. The user enters the relevant information onto each button. The information entered by the user is used as the search criteria to find files 7a and 7b in the Local Database 14 and the Network Database 15.

Alternatively, the user can search for a file 7a or 7b using its location in the real world hierarchical file structure 9. To do this, the user activates the document location button on the open card. The open module 13 will then activate the document locator module 20. The document locator module 20 displays the document location box on the screen and allows the user, as explained below, to identify a file 7a or 7b based on its location in the real world hierarchical file structure 9. When the file 7a or 7b has been located, the document locator module 20 will return control to the open module 13. Once the user has finished entering information onto the open card, the open module 13 uses the information to search the Local Database 14 and the Network Database 15 for each file 7a or 7b that fulfills the search criteria. The open module 13 will display each file 7 that fulfills the search criteria. The user may then select one of these files 7a or 7b.

Alternatively, prior to selecting a file 7a or 7b to be opened, the user may examine the network access privileges for a file 7a or 7b. In the representative embodiment, the user does this by highlighting the file name of a displayed file 7a or 7b, and activating a network access module 22.

The network access module 22 determines what privileges a user may have in relation to a file 7a or 7b. For example, a user may be able to read a file 7a or 7b, but not change the contents of the file 7a or 7b.

Figure 5:
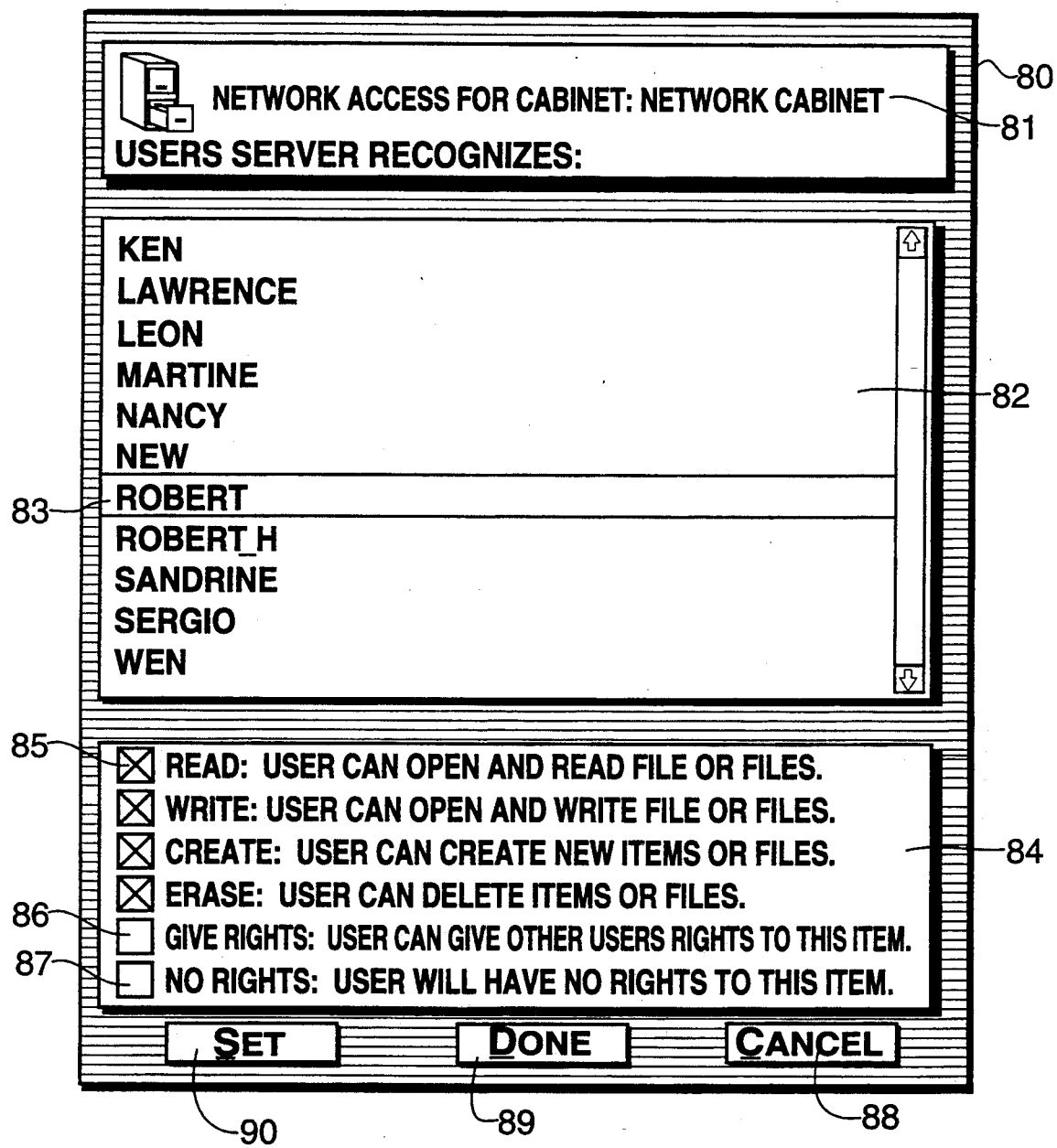
FIG. 5 is an example of the screen display generated by the network access module of FIG. 1.

A network access card, as discussed below in reference to FIG. 5, is operated by the network access module 22 and allows the user to view and, if authorized, change the access privileges for a file 7a or 7b.

The network access module 22 may also be activated from the document location box. By choosing the appropriate buttons (for example, the options button, then the network access button), the network access module 22 will be activated, allowing the user to view and change, if authorized, access privileges for a level in the real world hierarchical file structure 9.

When the user selects a file 7a or 7b to be opened, the open module 13 will pass to the operating system 8 the operating system name and path name for the file 7a or 7b the user wishes to open. This name and path name is stored in the Local Database 14 or the Network Database 15 in the entry related to the file 7a or 7b the user has selected. The open module 13 will then remove the open card from the screen. If the file the user has selected is stored on the local memory device 18, the file 7a will be opened by the operating system 8 and any corresponding application program that is needed will also be opened. If the file the user has selected is stored on the network storage device 19 and the user has access privileges, a network operating system 2 will copy the file 7b from the network storage device to the internal memory of the user's processor (not shown).

Control is returned to the wait module 11 which will run in the background until the user selects an "open", "save", or "save as" or "exit" command from the application program or the search command from the operating system.

Figure 2:
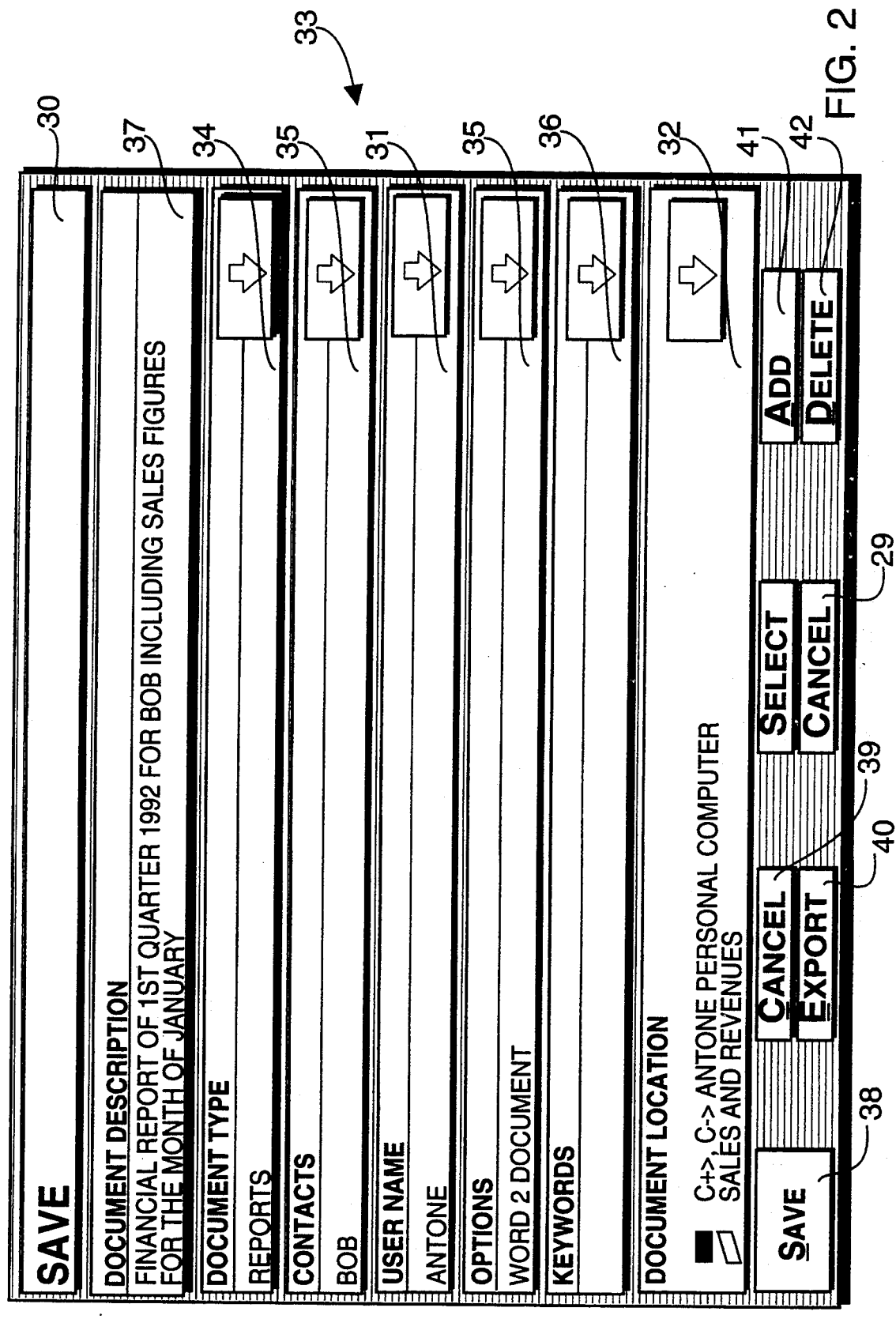
FIG. 2 is an example of the save card displayed by the save module of FIG. 1.

Referring now to FIG. 2, there is illustrated an example of the save card 30 which is displayed by the save module 12 of FIG. 1. The save card 30 shows the various "buttons" 31 to 37 that could be displayed to the user when the file 7a or 7b to be saved is a new file that has not previously been placed in the real world hierarchical file structure 9. The buttons 31 to 37 are examples of the type of information that could be stored by the save module 12 in the Databases 14 and 15 for each file 7a or 7b in the real world hierarchical file structure 9.

As examples of the type of buttons that could be displayed, there is illustrated a user name button 31, a document location button 32, a contact button 33, a document type button 34, an options button 35, a key words button 36 and a document description button 37 (which can be associated with a comments field in the Databases 14 and 15).

The document location button 32 is used to indicate where in the real world hierarchical file structure 9 the file 7a or 7b is located. For example, if the real world hierarchical data structure 9 contains folders, the name of the folder into which the file 7a or 7b is to be inserted can be shown on this button 32. By activating the document location button 32, a document location box as allows for the user to choose the actual position in the real world hierarchical file structure 9 where the file 7a or 7b is to be placed.

Also displayed on the save card 30 is a save button 38 (also called an "OK" button.) The same button allows the user to complete the save operation. When the user activates the save button 38, the save module 12 will store the information from the save card 30 in the relevant database (i.e. the Local Database 14 or the Network Database 15), give instructions so that the operating system 8 or network operating system 2 will store the file 7a or 7b in a memory device, place the file 7a or 7b (or a reference to the file) in the real world hierarchical file structure 9, and remove the save card 30 from the screen. Control is then returned to the application program. On the other hand, if the user selects the cancel button 29, the save procedure is aborted, the save card 30 is removed from the screen, and control is returned to the application program.

Figure 3:
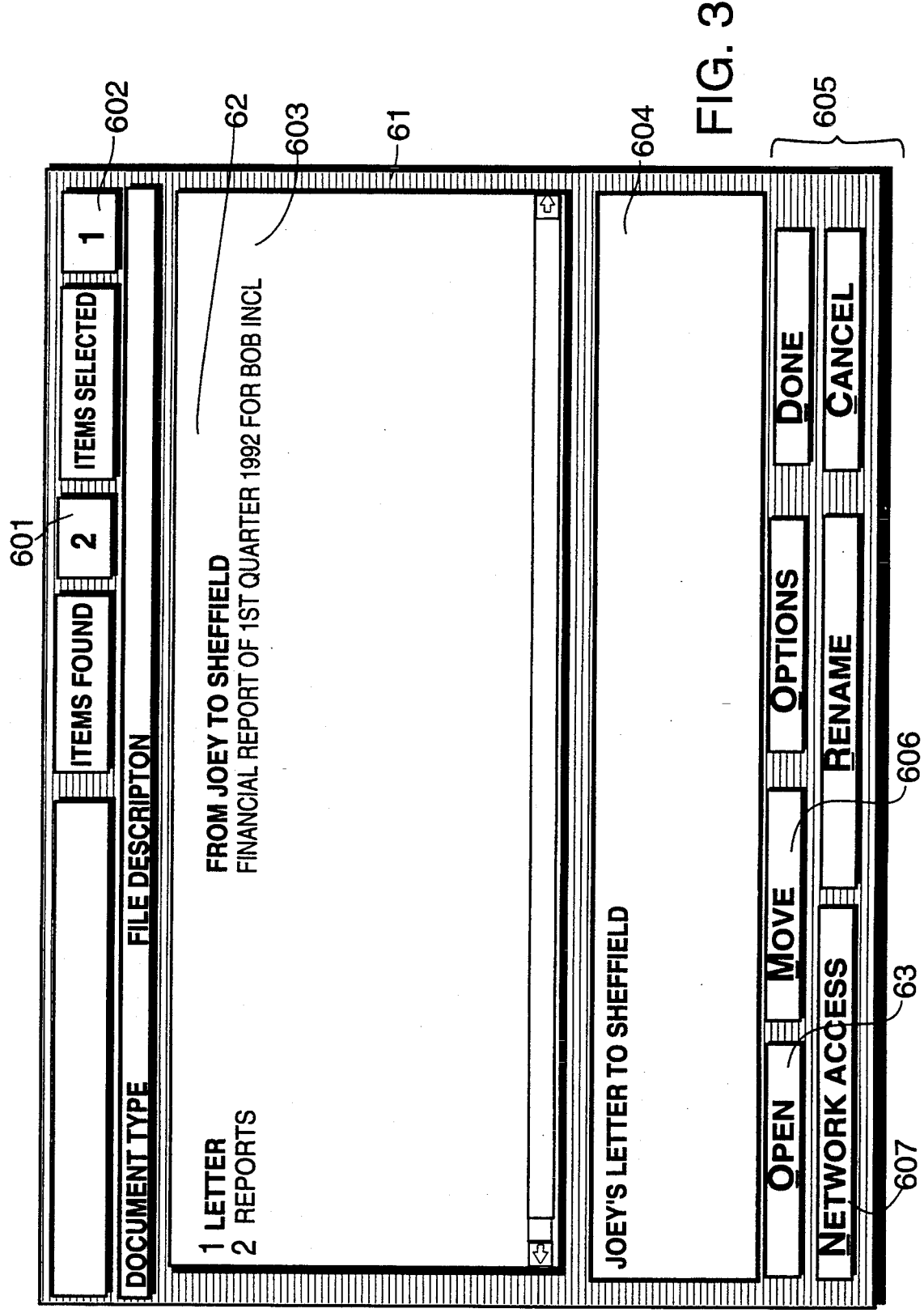
FIG. 3 is an example of the document found box, that can be accessed from the save card of FIG. 2.

Referring now to FIG. 3, there is illustrated an example of the documents found box 61. The document found box 61, in the representative embodiment, is accessed from the open card.

The open card (not shown) is displayed by the open module 13 of FIG. 1. The open card shows the various buttons that could be displayed when the user wishes to retrieve a file 7a or 7b from a memory device 18 or 19. The buttons are used to input information that could be used to identify and retrieve a file 7a or 7b. The information the user enters onto the buttons of the open card is used to search the Local Database 14 and the Network Database 15 for relevant files 7a or 7b. Files that are found are displayed in documents found window 60 of the documents found box 61.

The documents found box 61 displays the number 601 of items found by the search, the number (602) of items selected by the user (62), information (as specified by the user) (603) about the documents found, information (604) about the document(s) selected by the user (62), as well as action buttons 605, such as the open button 63 (to open the highlighted file 62) and a move button 606 (to move the document to another location in the real world hierarchical file structure 9.)

Further, the documents found box 61 has a network-access button 607. When the network access button 607 is activated, the network access card is displayed for the document(s) selected by the user 62.

Figure 4:
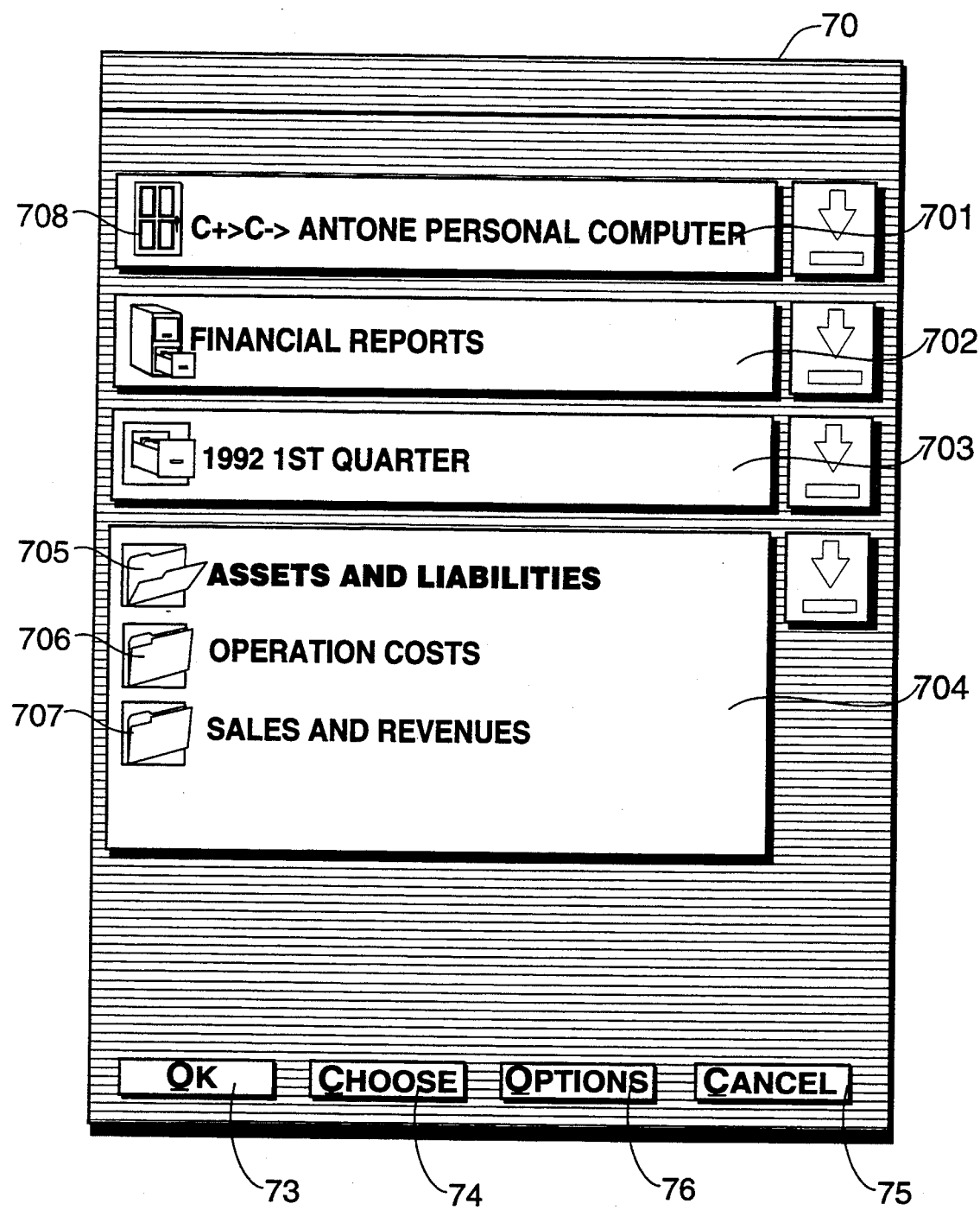
FIG. 4 is an example of the screen display generated by the Document Locator module of FIG. 1.

Referring now to FIG. 4, there is illustrated an example of a representative embodiment of the Document Location Box 70 which is displayed whenever the user selects the document location button 32 on the save card 20 of FIG. 2 or the equivalent document location button on the open card.

In the Document Location Box 70 are four action buttons, namely, an option button 76, an OK button 73, an open button 74 and a cancel button 75. The option button 76 provides the user with options in relation to a selected file/level (705) of the real world hierarchical file structure 9. These options include adding, deleting, moving and renaming a file/level and accessing the network access card for a file/level. The OK button 73 allows the user to signal to the document locator module 20 that the user has finished using the Document Location Box 70. The open button 74 allows the user to open the file that the user has selected. The cancel button 75 is to enable the user to turn to the open card or the save card 20 without affecting the status of the information on those cards.

In the example in FIG. 4, there is a window display for the door selected 701, for the filing cabinet selected 702, for the draw selected 703, and a window 704 displaying the folders 705-707 that may be selected to move to the next level in the real world hierarchical file structure 9. The "active" folder 705 is highlighted. If this is selected, then a further window (not shown) will be displayed showing the documents "stored" in the selected folder 705.

Alternatively, if the window display for the file cabinet 702 is selected, the draw window 703 and the folder window 704 will disappear and the filing cabinet window 702 will be shown, displaying all file cabinets for the door 708 displayed in the door window 701.

As stated above, the door icon in the door window 708 represents a storage device, although the user does not need to be aware of this fact.

Referring now to FIG. 5, there is illustrated an example of the network access window 80. In this example, it is assumed that the user has selected the filing cabinet 702 from the Document Location Box 70 of FIG. 4, and then accessed the network access window 80 via the options button 76.

Icon 81 shows that the network access window 80 gives the network access for a file cabinet called "Network Cabinet," which is, in the representative embodiment, the second level in the real world hierarchical file structure 9.

Window display 82 lists, in scrolling window format, users recognized by the network. A highlight bar 83 highlights a user, so that the user's network access privileges can be listed in an access display window 84.

The access display window 84 lists different access rights. For example, a user may have the right to read, write, create, erase, pass-on rights or have no rights in relation to a level in the real world hierarchical data structure 9.

In this example, user "Robert" has read (as signified by an "X" in the corresponding box (85)), write, create and erase rights. He can also create new levels or files at subsequent levels. This means user "Robert" can read and write files "stored in" the "Network Cabinet" (i.e. at levels subsequent to this level in the real world hierarchical file structure 9) and can create new levels (such as folders) or files to be "placed" in this cabinet, and can erase levels or files that are in this cabinet. User "Robert" cannot give these rights to other users on the network in relation to levels or files "stored" in the "Network Cabinet" (86).

When done with the network access window 80, the user can actuate the Done button 89 to return to the window from which the user came. Alternatively, the user can activate the Cancel button 88, to leave the network access window 80 without activating any changes that the user made to the network access window 80.

If the user has "give rights" privileges (86), the user can activate the Set button 90 to change the settings in the access display window 84.

If the no rights option 87 is set, then all rights are revoked, and the user cannot access files in this cabinet.

In the representative embodiment, network access features are controlled by an access program that runs on a server. A server is a dedicated central processor that controls the network operating system 2 (i.e. a NOS) and the network access program. The network access program can be stored on the network memory device 19 and run on the central processor (i.e. a processor common to all users on the network). Usually, the access program controls which user can have access to a file 7b stored on the network memory device 19. (The present invention can easily be adapted for a network having only one processor (such as a mini-computer) and only one operating system.)

In the representative embodiment, the operating system 8 runs a DOS, such as the MS-DOS operating system program. The server runs a NOS. When a user logs into the network, the user's operating system commands can be executed by the network operating system 2. When the user is not on the network, the user's operating system commands are interpreted by the (local) operating system 8.

When the user accesses a file 7b stored on the network memory device 19, the file 7b is loaded by the network operating system 2 onto a local memory device, such as (18). However, before the file 7b is loaded, the network operating system 2 causes the access program to check to see if the user is authorized to access the file 7b and what other access rights the user has in relation to the file 7b.

As is known in the art, each network access privilege setting for a file or directory is represented by a bit which can be set in a trustee mask. The trustee mask is used by the network operating system 2 to determine which files, directories and storage devices a user may access. The network access module 22 of the present invention can interface with the network operating system 2 to control access to levels in the real world hierarchical file structure 9 so that the user need not know about NOS commands and the existence of the network server and need not exit an application program to change access rights.

In a typical network, a supervisor user is granted supervisor status to control the operation of the network. Users are designated as the creating user (i.e., the user who created the particular file 7a or 7b or level in the real world hierarchical file structure 9) or as members of the everybody group (all users apart from the supervisor).

In a representative embodiment, where a network server is used, the following protocol is recommended to interface the network access module 22 of the present invention with the NOS and the access program run on a server.

1. Any user can add a door to a local memory device 18 via the Document Location Box 70. The user can then create a sub-structure of the real world hierarchical data structure 9 attached to that door. There is no interaction with the network operating system 2 or the network access program when the user accesses the local memory device.

2. To add a door to a network storage device 19, the user must be the supervisor. After the door is created, any user that is recognized by the network can create cabinets, drawers, and folders.

3. When a network door is created, TR_CREATE and the TR_ACCESS bits are set in the trustee mask for the everybody group. This allows anyone in the everybody group to see the door, and also allows them to create a structure within the door. The reason the TR_ACCESS bit must be set is to allow the network access module 22 to give the creator of a file cabinet exclusive rights to it. This is done by making the creator a trustee of the directory represented by the cabinet, and then setting all the 'TR' bits in the trustee mask (TR_ALL). This gives the creator all of the rights available to the new directory. P 4. After giving the creator total rights to the cabinet, the network access module 22 then makes the everybody group a trustee, and assigns the cabinet a TR_NONE mask.

The network access module 22 makes the everybody group a trustee so as to override the inherited rights mask of the door—which are TR_ACCESS and TR_CREATE.

5. The network access module 22 treats all directories the same, granting TR_ALL to the creator and TR_NONE to the everybody group for all directories (i.e. cabinets, drawers, and folders).

Thus, the trustee mask may look like this for each item:

TABLE A

|  | SUPERVISOR | CREATING USER | EVERYBODY GROUP |
| --- | --- | --- | --- |
| DOOR: | [SRWCEMFA] | N/A | [ C A] |
| CABINET: | [SRWCEMFA] | [RWCEMFA] | [ C A] |
| DRAWER: | [SRWCEMFA] | [RWCEMFA] | [ C A] |
| FOLDER: | [SRWCEMFA] | [RWCEMFA] | [ C A] |

In Table A, the rights a user may have are indicated by a letter, where S is supervisor, R is read, W is write, C is create, E is erase, M is modify, F is file and A is access.

Thus, if user grants:

READ rights, then TR_READ and TR_FILE bits are set in the trustee mask.

WRITE rights, then TR_WRITE, TR_FILE, and TR_MODIFY bits are set.

CREATE rights, then TR_CREATE, TR_FILE, and TR_MODIFY bits are set.

ERASE rights, then TR_ERASE, TR_FILE, and TR_MODIFY are set.

GRANT rights, then TR_ACCESS and TR_FILE bits are set.

NO RIGHTS, then all bits in the trustee mask are cleared.

The following code segment, written in the "C" programming language, is used by the network access module 22 to interact with the network server. It is an example of a function that could be used to set exclusive rights to a directory. In this embodiment, the code is written to interact with the NOVEL NETWARE NOS program. The module could be implemented in other programming languages or in hardware, and could be built to interact with other NOS programs.

```
// Function: Sets Exclusive Rights To A Directory
// Returns:  True if not successful, False if successful
```

```
S4 FUNCTION SetExclusiveRights(const char far *InPath)
{
char         UsePath[66];
WORD         objectType;
DWORD        objectID = -1;
BYTE         objHasProperties,objFlag,objSecurity,loginTime[7];
netID        aNetID;
char         name[48];
int          failed;
NWDIR_ENRY   EntryTable;

lstrcpy(UsePath,InPath);
    object ID=-1;
    //When Creating Cabinet Drawer Folder
    if (!SetAndStoreDefaultServer(UsePath[0]-'A'))
            {
                    FreeLibrary(hNWDIRLibrary);
                    FreeLibrary(hNWWRKSTNLibrary);
                    FreeLibrary(hNWSERVERLibrary);
                    FreeLibrary(hNWCONNLibrary);
                    FreeLibrary(hNWBINDLibrary);
                    return(FALSE);
            }
    if (lpfnGetConnectionInformation(lpfnGetConnectionNumber(),
        name,&objectType,&objectID,loginTime))
            {
                    RestoreDefaultServer();
                    FreeLibrary(hNWDIRLibrary);
                    FreeLibrary(hNWWRKSTNLibrary);
                    FreeLibrary(hNWSERVERLibrary);
                    FreeLibrary(hNWCONNLibrary);
                    FreeLibrary(hNWBINDLibrary);
                    return(FALSE);
            }
    if (lpfnGetConnectionInformation(lpfnGetConnection
        Number(), name, &objectType, &objectID, loginTime)
        return(0);

//Give Maker of Item exclusive rights - Give Creator All Rights
    failed = lpfnSetTrustee(WORD)lpfnGetDefault ConnectionID(),
                    (BYTE)lpfnGetDirectoryHandle(UsePath[0]-'A'),
                    (char far *) ((UsePath[1] ==':') ?
                    (UsePath+2) : UsePath), objectID, TR_ALL);

//Intercept Any Inherited Rights Of The Everyone Group
    failed = SetPathRightsForObject("EVERYONE",
                    OT_USER_GROUP,TR_NONE,UsePath,FALSE);

//Everyone "No Rights"
    RestoreDefaultServer();
    FreeLibrary(hNWDIRLibrary);
    FreeLibrary(hNWWRKSTNLibrary);
    FreeLibrary(hNWSERVERLibrary);
    FreeLibrary(hNWCONNLibrary);
    FreeLibrary(hNWBINDLibrary);
return (0);
}

//Adding Door
   else if(Drives[NewDrive]==DRIVE_REMOTE)
            {
                    if(LoadNovellLibrary())
                            {
                                    TempStr[0]=NewDrive+'A';
                                    TempStr[1]=':';
                                    TempStr[2]='\0';
                                    lstrcat(TempStr, "\\turdbutt");
```

```
                    if(!mkdir(TempStr))
            {
                    SendMessage(hItemList,CB_SETEDIT_SEL,
                    NULL, OxFFF0000);
                    SendMessage(hItemList,WM_CLEAR, NULL,
                    NULL);
                    object ID=-1;
                    if .
                    (!SetAndStoreDefaultServer(NewDrive))
                    {
                    FreeLibrary(hNWDIRLibrary);
                    FreeLibrary(hNWWRKSTNLibrary);
                    FreeLibrary(hNWSERVERLibrary);
                    FreeLibrary(hNWCONNLibrary);
                    FreeLibrary(hNWBINDLibrary);
                    return(FALSE);
                    }
            if (lpfnGetConnectionInformation
                    (lpfnGetConnectionNumber(), name,
                    &objectType, &objectID))
                    {
                            RestoreDefaultServer();
                            FreeLibrary(hNWDIRLibrary);
                            FreeLibrary(hNWWRKSTNLibrary);
                            FreeLibrary(hNWCONNLibrary);
                            return(FALSE);
                    }
            TempStr[0]=NewDrive+'A';
            TempStr[1]=':';
            TempStr[2]='\0';
            lstrcat(TempStr, "\\turdbutt");
            //Set Every One Group Create and Access Rights
            failed = SetPathRightsForObject("EVERYONE",
                    OT_USER_GROUP,
                    (TR_CREATE | TR_ACCESS), Temp);
                                        GetVolumeFromDriveLetter
    (NewDrive, szNewItemName);
            TempStr[1]= '\0';
            lstrcat(TempStr, "->     ");
            lstrcat(TempStr, szNewItemName);
            lstrcpy(szNewItemName, TempStr);
            ItemIndex=SendMessage(hItemList, CB_ADDSTRING,
                    NULL, (LONG)szNewItemName);
            lstrcpy (JunkBuffer, szNewItemName);
            RestoreDefaultServer();
            FreeLibrary(hNWDIRLibrary);
            FreeLibrary(hNWWRKSTNLibrary);
            FreeLibrary(hNWSERVERLibrary);
            FreeLibrary(hNWCONNLibrary);
            FreeLibrary(hNWBINDLibrary);
            SetFocus(hItemList);
            return(TRUE);
            }
    }
```

The following statements can be used to make a user access rights mask:

```
selectedRightMask |= SendMessage (hReadCheckBox, BM_GETCHECK,0,0) ?
                    TR_READ : TR_NONE;
selectedRightMask |= SendMessage(hWriteCheckBox, BM_GETCHECK, 0, 0) ?
                    (TR_WRITE | TR_MODIFY) : TR_NONE;
selectedRightMask |= SendMessage(hEraseCheckBox, BM_GETCHECK, 0, 0) ?
                    (TR_ERASE | TR_MODIFY) : TR_NONE;
selectedRightMask |= SendMessage(hCreateCheckBox,BM_GETCHECK, 0, 0) ?
                    (TR_CREATE | TR_MODIFY) : TR_NONE;
selectedRightMask |= SendMessage(hAccessCheckBox,BM_GETCHECK, 0, 0) ?
```

```
                    TR_ACCESS : TR_NONE;
selectedRightMask |= SendMessage(hNoneCheckBox, BM_GETCHECK,0,0) ?
                    TR_NONE : TR_ALL;

if (SelectedRightsMask)
      SelectedRights Mask |= TR_FILE;
```

The following function is representative of a function to add and remove user access rights.

```
WORD S4FUNCTION setPathRights(netID*user,const char *path)
{
WORD failed = 0;

if (user->rightsChanged)
{
       if (user->rightsMask)
              failed =
              lpfnSetTrustee(WORD)lpfnGetDefaultConnectionID(),
                            (BYTE)lpfnGetDirectoryHandle(path[0]-'A'),
                            (char far *) ((path[1] ==':') (path+2) :
                            path),
                            user->binderyObjectID,
                            user->rightsMask);
       else
              failed =
              lpfnSetTrustee((WORD)lpfnGetDefaultConnectionID();
                            (BYTE)lpfnGetDirectoryHandle(path[0]-'A'),
                            (char far *) ((path[1] ==':') ? (path+2) :
                            path), TR_NONE);
}
return(failed ? FALSE : TRUE);
}
```

Referring now to FIG. 6 there is listed in chart form the fields of the Network Database 15 of FIG. 1. The Local Database 14 has a similar structure.

The Network Database 15 consists of fields, in this example twenty-three defined fields, with each field-name listed in a field-name column (220). For each field, there is listed in a type column (222) whether the field contains characters or a date. If a field contains a character, a "C" is displayed next to the field name in the type column (222). If the field contains a date then a "D" is listed in the type column 221 next to the respective field name. A length column (224) lists the number of characters that can be stored in each field.

The following fields, listed in the filed name column (220), deserve comment.

DKEYCODE is a character field which contains the code for the directory entry for the entry. (The code is generated by the save module 12 when the file is saved or a level in the real world hierarchical data structure 9 is created.) In the representative embodiment, the DKEYCODE entry is eight characters long, the maximum length permitted by the MS-DOS operating system.) In the representative embodiment, the Local Database's (14) DKEYCODE start with "L". For example, a typical DKEYCODE for a file stored on a network memory device 19 may be "00000003" and a typical DKEYCODE for a file stored on a local memory device 18 may be "L0000003". For a storage device (represented by a 'door' in the real world hierarchical data structure 9), the entry is "0000000C", where "C" is the storage device letter.

SKEYCODE is a character field that contains a code for the parent directory. For example, in the MS-DOS operating system, if C: \ DRNAME \ L0000004 \ L0000003 is the path name for an entry, then the SKEYCODE is L0000004 and the DKEYCODE is L0000003. ("DRNAME" signifies that the directory/file is recognized by the modules of the present invention.) For a storage device (represented by a 'door' in the real world hierarchical data structure 9), the entry is "000000X".

The DATATYPE field stores a "D" if the entry is a directory.

PATHNAME is a field that stored the operating system path name for an entry. In the example above, C: \ DRNAME \ L0000004 \ L0000003 is the path name. In the Network Database 15, the drive letter is omitted. Thus the equivalent entry in the Network Database 15 is \ DRNAME \ L0000004 \ L0000003.

ICONCODE is a field that stores the level in the real world hierarchical file structure 9. The entry is a code that represents the icon for the level. For example, in the representative embodiment, the entry for a 'door' is 0, for a 'file cabinet' is 1 and for a 'draw' is 2.

Use of this two database structure insures that there will not be local directory codes and entries that are duplicated on the Network Database 15. For the Local Database 14, the user has the exclusive use of the database's index file.

What is claimed is:

1. In a computer network comprising a processor, a local memory device, a network memory device and a monitor, the processor operating according to an application program and an operating system, a method for saving a file, the method comprising:

(a) selecting a save command using the application program;

(b) intercepting control from the application program before the application program displays a save user interface;

(c) displaying on the monitor a save card;

(d) accepting information about the file on the save card;

(e) accepting information about a location at which the file is to be saved in a form independent of the form required by the operating system or the application program;

(f) selecting as a nominated memory either the network memory device or the local memory device depending upon the contents of information about the location at which the file is to be save;

(g) storing the accepted information in a database in the nominated memory device;

(h) storing in the database the location at which the file is to be saved in a form required by the operating system; and (i) storing the file in the nominated memory device.

2. The method of claim 1 further comprising, after step (f), the steps of:

(a) displaying on the monitor a network access card;

(b) accepting information about a set of access privileges for the file; and (c) causing the set of network access privileges for the file to be modified by interacting with a server.

3. In a computer network comprising a processor, a local memory device, a network memory device and an output device, the processor operating according to an application program and a operating system, a method for retrieving a file from a nominated memory device, the method comprising:

(a) selecting an open command using the application program;

(b) intercepting control from the application program before the application program displays an open user interface;

(c) displaying on the output device an open card;

(d) accepting information about the file on the open card;

(e) accepting on the open card information about the location at which the file is saved in a form independent of the form required by the operating system or the application program;

(f) determining whether the file is stored on the local memory device or the network memory device;

(g) nominating as the nominated memory device the memory device on which the file is stored;

(h) retrieving an operating system location for the file from a database in the nominated memory device using information stored in the database relating to the file; and (i) utilizing the operating system location to retrieve the file from the nominated memory device.

4. In a computer network comprising a processor, a local memory device, a network memory device and an output device, the processor operating according to an application program and an operating system, a method for retrieving a file from a nominated memory device, the method comprising:

(a) selecting an open command using the application program;

(b) intercepting control from the application program before the application program displays an open user interface;

(c) displaying on the output device an open card;

(d) accepting as input information about the file independent of operating system conventions;

(e) determining, utilizing the information about the file, whether the file is stored on the local memory device or the network memory device;

(f) nominating as the nominated memory device the memory device on which the file is stored;

(g) retrieving an operating system location for the file from a database in the nominated memory device using information stored in the database relating to the file; and (h) retrieving, utilizing the operating system location, the file from the nominated memory device.

5. In a computer network comprising a processor, a local memory device, a network memory device and an output device, the processor operating according to an application program and an operating system, a method for retrieving a file from a nominated memory device, the method comprising:

(a) selecting an open command using the application program;

(b) intercepting control from the application program before the application program displays an open user interface;

(c) displaying on the output device an open card;

(d) accepting information on the open card about the location at which the file is saved in a form independent of the form required by the operating system or the application program;

(e) determining, utilizing the accepted information, whether the file is stored on the local memory device or the network memory device;

(f) nominating as the nominated memory device the memory device on which the file is stored;

(g) retrieving an operating system location for the file from a database in the nominated memory device using information stored in the database relating to the file; and (h) retrieving, utilizing the operating system location, the file from the nominated memory device.

6. In a computer network comprising a processor, a local memory device, a network memory device and an output device, the processor operating according to an application program and an operating system, a method for saving a file, the method comprising:

(a) selecting a save command using the application program;

(b) intercepting control from the application program before the application program requests save information;

(c) displaying on the output device a save card;

(d) accepting, as optional input, information about the file;

(e) accepting information about the location at which the file is to be saved in a form independent of the form required by the operating system or the application program;

(f) selecting as a nominated memory either the network memory device or the local memory device depending upon the location at which the file is to be save;

(g) storing the accepted information in a database in the nominated memory device;

(h) storing the location at which the file is to be saved in a form required by the operating system in the database; and (i) storing the file in the nominated memory device according to operating system conventions.

7. The method of claim 6 further comprising, after step (f), the steps of:

(a) displaying on the output device a network access card;

(b) accepting information about a set of access privileges for the file; and (c) causing to be modified the set of network access privileges for the file by interacting with a server.

8. For use on a computer network, the computer network including a server and computer processor capable of executing an application program, the computer processor coupled to the server, the server coupled to a plurality of network storage devices, each network storage device storing a plurality of files in a directory structure, the server comprising a network access program that sets and checks a set of access privileges for each one of the plurality of files, each one of the directories in the directory structure and each network storage device, a method for setting network access privileges comprising the steps of:

intercepting control from the application program without exiting the application program when a predetermined command is communicated to the application program;

thereafter, selecting as an item one of the plurality of files, one of the directories in the directory structure or one of the plurality of network storage devices;

displaying on an output device coupled to the computer processor the item selected and the set of access privileges for the item;

specifying a new set of access privileges for the item; and causing the network access program of the server to alter the set of access privileges for the item.

9. In a local area network comprising a processor, a local memory device, a network memory device, a database and an output device, the processor operating according to an application program and an operating system, a method for retrieving a file from a nominated memory device, the method comprising:

(a) selecting an open command using the application program;

(b) intercepting control from the application program before the application program displays an open user interface;

(c) displaying on the output device an open card;

(d) accepting information about the file on the open card;

(e) accepting on the open card information about the location at which the file is saved in a form independent of the form required by the application program;

(f) determining, utilizing the information accepted at steps (d) and (e), whether the file is stored on the local memory device or the network memory device;

(g) nominating as the nominated memory device the memory device on which the file is stored;

(h) retrieving an operating system location for the file from the database using information stored in the database relating to the file; and (i) utilizing the operating system location to retrieve the file from the nominated memory device.

10. The method of claim 9 wherein the database is stored on the nominated memory device.

11. In a local area network comprising a computer processor, a local memory device, a network memory device, a database and an output device, the computer processor operating according to an application program and an operating system, a method for retrieving a file from a nominated memory device, the method comprising:

(a) selecting an open command using the application program;

(b) intercepting control from the application program before the application program displays an open user interface;

(c) displaying on the output device an open card;

(d) accepting information on the open card about the location at which the file is saved in a form independent of the form required by the application program;

(e) determining, utilizing the accepted information, whether the file is stored on the local memory device or the network memory device;

(f) nominating as the nominated memory device the memory device on which the file is stored;

(g) retrieving an operating system location for the file from the database using information stored in the database relating to the file; and (h) retrieving, utilizing the operating system location, the file from the nominated memory device.

12. The method of claim 11 wherein the database is stored on the nominated memory device.

13. A file directory and retrieval system for use in a computer network, the computer network comprising an output device, a local memory, a shared memory, and a local processor operating according to an operating system program and an application program, the local memory and the shared memory storing files in a directory structure having levels, each file and level in the directory structure having network access privileges, the local memory and shared memory comprising the highest level of the directory structure, the file directory and retrieval system comprising:

a map mapping the directory structure of the files stored in the memory to a real world hierarchical file structure of files and directories independent of conventions of the operating system program;

means for changing the network access privileges of files and directories without exiting the application program;

means, operating in the background of the application program and intercepting control of the local processor when a command is executed to cause a file to be opened, for displaying on the output device an open card to allow entry of information relating to the contents of the file and location of the file in the real world hierarchical file structure, utilizing the map for mapping the location of the file in the real world hierarchical file structure to the directory structure, and for causing the operating system program to issue a command to open the file; and means, operating in the background of the application program and intercepting control of the local processor when a command is executed to cause the application program to request information about a file to be saved, for displaying on the output device a save card to allow entry of information relating to the contents of the file to be saved and a location for the file in the real world hierarchical file structure, utilizing the map for mapping the location for the file in the real world hierarchical file structure to the directory structure and for causing the operating system program to issue a command to save the file in the directory structure.

14. The file directory and retrieval system of claim 13 further comprising means for creating, moving and deleting files and directories without exiting the application program.

15. The file directory and retrieval system of claim 13 further comprising means for controllably displaying a graphical representation on the output device of the real world hierarchical file structure.

16. The file directory and retrieval system of claim 13 further comprising a network processor coupled to the local processor, the network processor interacting with the means for changing the network access privileges to cause a set of access bits to be modified.

17. A file directory and retrieval system for use in a computer network, the computer network comprising an output device, a local memory, a shared memory, and a local processor operating according to an operating system and an application program, the local memory and the shared memory storing files in a directory structure having levels, the directory structure organized according to conventions of the operating system, each file and level in the directory structure having network access privileges, the local memory and shared memory comprising the highest level of the directory structure, the file directory and retrieval system comprising:

a map mapping the directory structure of the files stored in the memory to a real world hierarchical file structure of files and directories independent of conventions of the operating system;

means for changing the network access privileges for files and directories without exiting the application program; and means, operating in the background of the application program and intercepting control of the local processor when a command is executed to cause a file to be opened, for displaying on the output device an open card to allow entry of information relating to the contents of the file and location of the file in the real world hierarchical file structure, for utilizing the map for mapping the location of the file in the real world hierarchical file structure to the directory structure, and for causing the file to be opened.

18. The file directory and retrieval system of claim 17 further comprising means for creating, moving and deleting directories without exiting the application program.

19. The file directory and retrieval system of claim 17 further comprising means for controllably displaying a graphical representation on the output device of the real world hierarchical file structure.

20. The file directory and retrieval system of claim 17 further comprising a network processor coupled to the local processor, the network processor interacting with the means for changing the network access privileges to cause a set of access bits to be modified.

21. A file directory system for use in a computer network, the computer network comprising an output device, a local memory, a shared memory, and a local processor operating according to an operating system and an application program, the local memory and the shared memory storing files in a directory structure having levels, the directory structure organized according to conventions of the operating system, each file and level in the directory structure having network access privileges, the local memory and shared memory comprising the highest level of the directory structure, the file directory system comprising:

a map mapping the directory structure of the files stored in the memory to a real world hierarchical file structure of files and directories independent of conventions of the operating system;

means for changing the network access privileges for files and directories without exiting the application program; and means, operating in the background of the application program and intercepting control of the local processor when a command is executed to cause the application program to request information about a file to be saved, for displaying on the output device a save card to allow entry of information relating to the contents of the file to be saved and a location for file in the real world hierarchical file structure, for utilizing the map for mapping the location of the file in the real world hierarchical file structure to the directory structure, and for causing the file to be saved in the directory structure.

22. The file directory system of claim 21 further comprising means for creating, moving and deleting directories without exiting the application program.

23. The file directory system of claim 21 further comprising means for controllably displaying a graphical representation on the output device of the real world hierarchical file structure.

24. The file directory system of claim 21 further comprising a network processor coupled to the local processor, the network processor interacting with the means for changing the network access privileges to cause a set of access bits to be modified.

25. A file directory and retrieval system for use in a computer network, the computer network comprising an output device, a local memory, a shared memory, and a local processor operating according to an operating system and an application program, the local memory and the shared memory storing files in a directory structure having levels, the directory structure organized according to conventions of the operating system, the local memory and shared memory comprising the highest level of the directory structure, the file directory and retrieval system comprising:

computer-implemented means for mapping the directory structure of the files stored in the memory to a real world hierarchical file structure of files and directories independent of conventions of the operating system;

computer-implemented means for changing network access privileges for directories without exiting the application program;

computer-implemented means, operating in the background of the application program and intercepting control of the local processor when a command is executed to cause a file to be opened, for displaying on the output device an open card to allow entry of information relating to the contents of the file and location of the file in the real world hierarchical file structure and for causing the file to be opened; and computer-implemented means, operating in the background of the application program and intercepting control of the local processor when a command is executed to cause the application program to request information about a file to be saved, for displaying on the output device a save card to allow entry of information relating to the contents of the file to be saved and a location for the file in the real world hierarchical file structure and for causing the file to be saved.

26. The file directory and retrieval system of claim 25 further comprising means for creating, moving and deleting directories without exiting the application program.

27. The file directory and retrieval system of claim 25 further comprising means for controllably displaying a graphical representation on the output device of the real world hierarchical file structure.

28. A computer network to store and retrieve files in a systematic manner, each file stored in a local storage device or in one of a plurality of network storage devices, the files arranged on each storage device in a directory structure, the computer network comprising:
   a network database that stores information about each file stored on the network storage devices, the information comprising user input details about the contents of each file and the position of each file in directory structure of the respective storage device;
   a local database that stores information about each file stored on the local storage device, the information comprising user input details about the contents of each file and the position of each file in directory structure of the local storage device;
   means for inputting information about each file utilizing a graphical user interface comprising hierarchically arranged icons that represent the directory structure;
   means for storing a file on a storage device; and
   means for retrieving the file stored on a storage device utilizing said graphical user interface.

29. A network access interface controller operateable on a computer processor, the computer processor capable of executing an application program, the computer processor coupled to a server, the server coupled to a plurality of network storage devices, each network storage device storing a plurality of files in a directory structure, the server comprising a network access program that sets and checks a set of access privileges for each one of the plurality of files, each one of the directories in the directory structure and each network storage device, the network access interface controller comprising:
   means for intercepting control from the application program without exiting the application program when a predetermined command is received by the application program;
   means for selecting as an item one of the plurality of files, one of the directories in the directory structure or one of the plurality of network storage devices;
   means for displaying on an output device coupled to the computer processor the item selected and the set of access privileges for the item;
   means for specifying a new set of access privileges for the item; and
   means for causing the network access program of the server to alter the set of access privileges for the item.

30. The network access interface controller of claim 29 wherein the set of access privileges comprises supervisor rights, read rights, write rights, modify rights, create rights, erase rights, access rights, and file rights.

31. The network access interface controller of claim 30 further comprising means, when a file, a directory or a network storage device is added to the directory structure, for giving a network supervisor, read rights, write rights, modify rights, create rights, erase rights, access rights, supervisor rights and file rights.

32. The network access interface controller of claim 30 further comprising means, when a file or a directory is added to the directory structure, for giving a creating user read rights, write rights, modify rights, create rights, erase rights, access rights, and file rights.

33. The network access interface controller of claim 29 wherein the means for causing the network access program of the server to alter the set of access privileges for the item further comprises means for altering a trustee rights mask.

34. A network access interface controller operateable on a computer processor, the computer processor capable of executing an application program, the computer processor coupled to a server, the server coupled to a plurality of network storage devices, each network storage device storing a plurality of files in a directory structure, the server comprising a network access program that sets and checks a set of access privileges for each one of the plurality of files, each one of the directories in the directory structure and each network storage device, the network access interface controller comprising:
   means for intercepting control from the application program without exiting the application program when a predetermined command is communicated to the application program;
   means, utilizing a graphical user interface comprising hierarchically arranged icons, for selecting as an item one of the plurality of files, one of the directories in the directory structure or one of the plurality of network storage devices;
   means for displaying on an output device coupled to the computer processor the item selected and the set of access privileges for the item;
   means for specifying a new set of access privileges for the item; and
   means for causing the network access program of the server to alter the set of access privileges for the item.

* * * * *